United States Patent [19]
Amemiya et al.

[11] Patent Number: 5,636,206
[45] Date of Patent: Jun. 3, 1997

[54] SYSTEM FOR ACHIEVING ALARM MASKING PROCESSING

[75] Inventors: Shigeo Amemiya; Yuichi Matsuda; Takao Ogura; Yasuki Fujii; Koji Tezuka, all of Kawasaki; Hiromi Ueda, Yokohama; Hitoshi Uematsu, Yokosuka, all of Japan

[73] Assignee: Fujitsu Limited, Kanagawa, Japan

[21] Appl. No.: 445,397

[22] Filed: May 19, 1995

[51] Int. Cl.⁶ ........................................ H04J 3/14
[52] U.S. Cl. .................. 370/244; 370/399; 370/426; 340/825.16; 340/825.17
[58] Field of Search .................... 370/13, 14, 15, 370/16, 17, 60.1, 60, 94.1, 58.1, 68.1, 110.1, 85.6; 340/825.06, 825.16, 825.17; 371/57.2

[56] References Cited

U.S. PATENT DOCUMENTS

| | | | |
|---|---|---|---|
| 5,274,641 | 12/1993 | Shobatake et al. | 370/16 |
| 5,343,462 | 8/1994 | Sekihata et al. | 370/13 |
| 5,359,600 | 10/1994 | Ueda et al. | 370/60.1 |
| 5,461,607 | 10/1995 | Miyagi et al. | 370/94.1 |

*Primary Examiner*—Wellington Chin
*Assistant Examiner*—Huy D. Vu
*Attorney, Agent, or Firm*—Helfgott & Karas, P.C.

[57] ABSTRACT

An alarm masking system is provided which is capable of implementing alarm priority processing or alarm inhibit processing in ATM transmission equipment. In ATM transmission equipment, a received virtual path or virtual channel is switched by means of a switching unit and then sent to an interface unit. In doing this, if a higher priority alarm is detected or received at a reception side interface unit, an intra-office tag is added to the alarm cell and then it is output, so that by detecting this intra-office tag it is possible to inhibit generation of lower priority alarms in response to the higher order alarm.

24 Claims, 13 Drawing Sheets

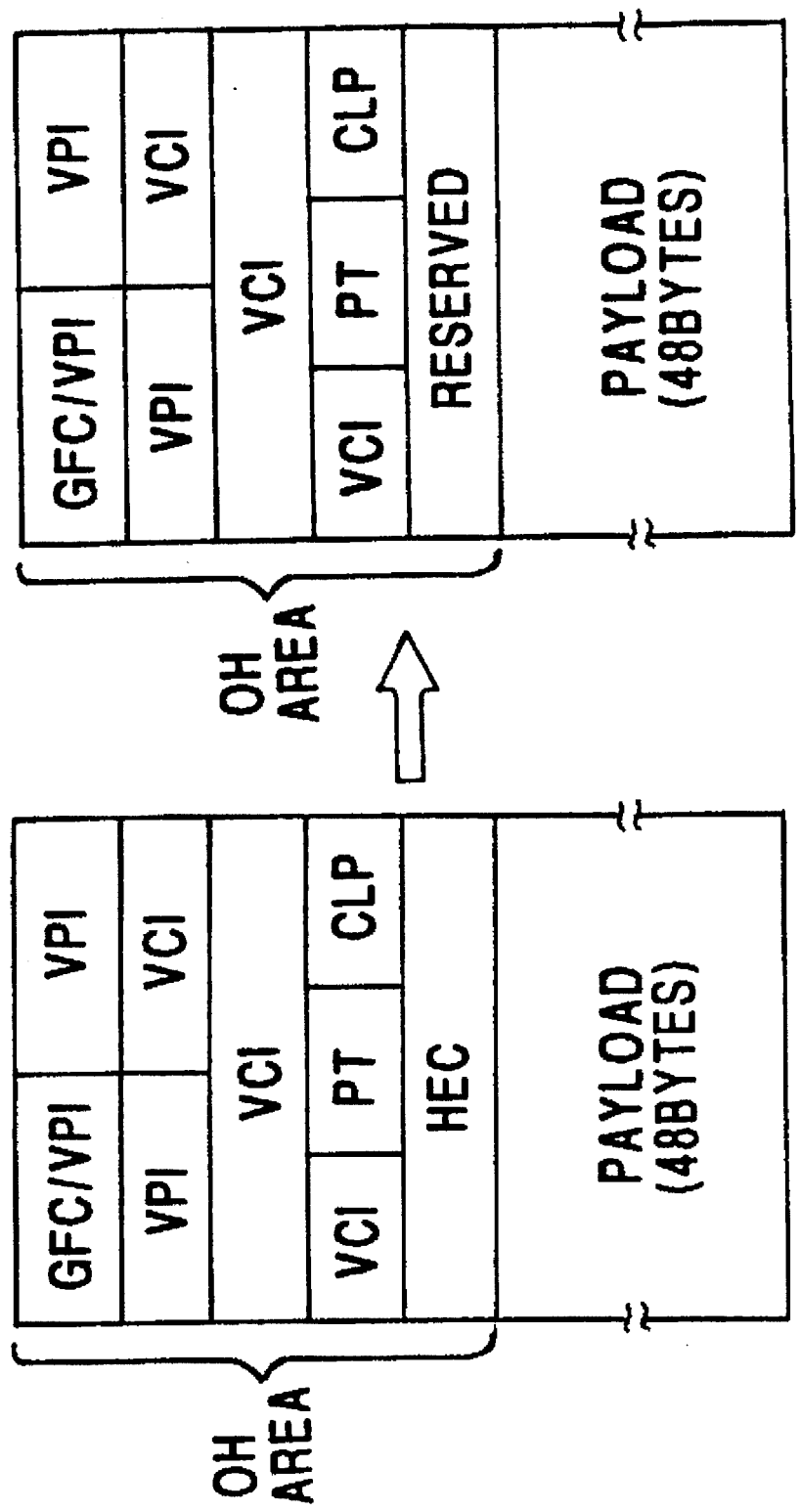

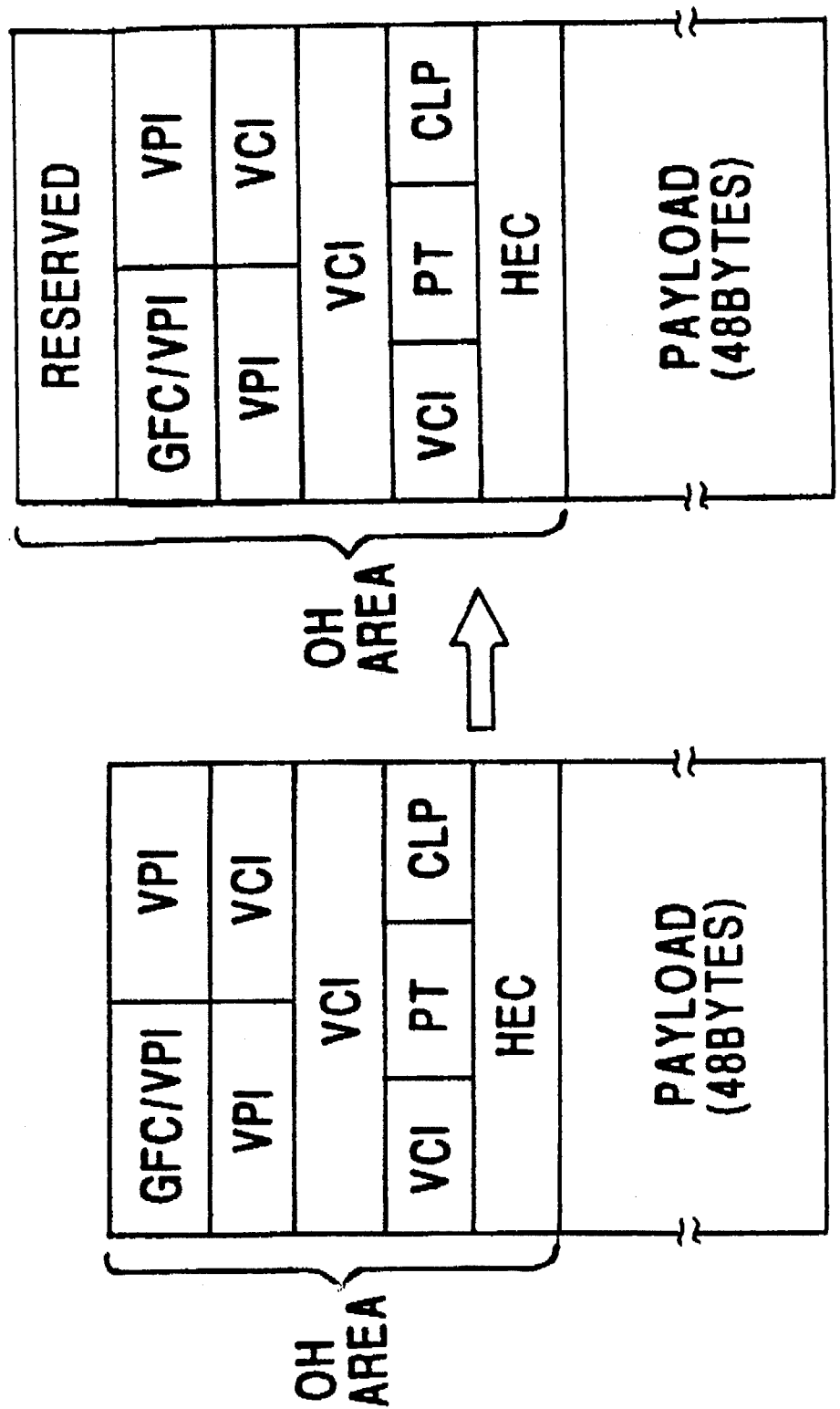

|  | a | b |
|---|---|---|
| A-IF | ALARMS DETECTED AT POINT INDICATED BY ○<br><br>LOS<br>LOF<br>RS-SD<br>RS-ERR<br>REP<br>MS-AIS<br>MS-SD<br>MS-FERF<br>MS-ERR<br>MS-FEBE<br>LOP<br>P-AIS<br>P-FERF<br>P-ERR<br>P-FEBE<br>LOC | ALARMS DETECTED AT POINT INDICATED BY ⊠<br><br>VP-AIS<br>VP-FERF<br>FEUSF<br>FEURF<br>VP-ERR |
| B-IF | ALARMS DETECTED AT POINT INDICATED BY ⊗<br><br>VP-AIS<br>VP-FERF<br>FEUSF<br>FEURF<br>VP-ERR | ALARMS DETECTED AT POINT INDICATED BY □<br><br>LOS<br>LOF<br>RS-SD<br>RS-ERR<br>REP<br>MS-AIS<br>MS-SD<br>MS-FERF<br>MS-ERR<br>MS-FEBE<br>LOP<br>P-AIS<br>P-FERF<br>P-ERR<br>P-FEBE<br>LOC |

FIG.13

SYSTEM FOR ACHIEVING ALARM MASKING PROCESSING

BACKGROUND OF THE INVENTION

1. Field of the Invention

The present invention relates to a system for achieving a masking processing with respect to alarms, and more particularly to a system for achieving a masking processing with respect to alarms for the purpose of performing priority processing of alarms in ATM (asynchronous transfer mode) transmission equipment.

2. Description of the Related Art

In transmission equipment, when failure occurs, because it is necessary to notify the operating system of this quickly, an alarm notification device is provided. In general when performing this notification, priority processing of the alarms is performed in notifying the host equipment (operating system).

In this case, the priority processing is performed to assign a priority sequence to alarms, based on the following basic concept.

<1> In the case in which a plurality of alarms occur simultaneously upon the occurrence of a failure, the priority sequence is established so that only one alarm directly related to the cause of the failure (the primary alarm) is issued, the generation of alarms induced by the primary alarm (secondary alarms) being suppressed.

<2> In the alarm detection protection process, in preventing erroneous detection of secondary alarms, a priority sequence is not provided.

<3> With regard to alarms which cannot occur simultaneously, a priority sequence is not assigned.

In recent years, advances have been made in the development of ATM transmission systems, which are a type of fixed-length packet transmission system based on B-ISDN (broadband-integrated services digital network) technology, this making necessary a alarms masking processing system for use in ATM transmission equipment.

As will be described later, with reference made to the accompanying drawings, for the purpose of performing VP and VC switching in equipment that switching data, after the VP (VC) received at each IF unit is switched, transmission is done by a different IF unit. For example, each VP (VP-a, VP-b, ..., VP-n) received by the IF-A unit via a switch and transmitted from different IF units (IF-A, IF-B, ..., IF-N). If a higher level alarm occurs at IF-A, it is necessary to mask the detection of alarms by alarm cells (monitor cells) which are switched to each IF unit.

In general, a method of implementing such a alarms masking in the case in which a higher level alarm is detected at the receiving side is to use firmware (software) to mask the alarm detected at the transmitting side. However, because alarm cells and monitor cells are distributed to a plurality of IFs by means of VPI conversion (routing), it is necessary to search for the destination VP (VC) for each VP (VC), and to mask all related masks. For this reason, the amount of processing required is huge, making this unimplementable in practice.

SUMMARY OF THE INVENTION

For the purpose of resolving the shortcomings of the prior art, the present invention provides an alarm masking processing system for use in ATM transmission equipment, wherein when a high-priority alarm occurs or when the corresponding alarm is inhibited, intra-office tags are added to alarm cells (monitor cells), thereby enabling these intra-office tags to be used to establish whether the alarm is to be detected at the alarm detection unit, thus enabling the implementation of the intended alarm masking processing.

To achieve the above-noted object, the present invention has a constitution as described below. In general, in ATM transmission equipment, a virtual path or virtual channel received via reception-side interface unit, is switched at a switching unit, and is transmitted via a transmission-side interface unit. In this case, in the present invention, when a high-priority alarm is detected or received at the reception-side interface unit, it is sent out after adding an intra-office tag. By doing this, when the intra-office tag is detected at the transmission-side interface unit, the detection of low-priority alarms generated based on this high-priority alarm is inhibited.

BRIEF DESCRIPTION OF THE DRAWINGS

The above and the features of the present invention will be more apparent from the following description of the preferred embodiments, with reference being made to the accompanying drawings, wherein:

FIG. 2 is a drawing which shows the first embodiment of the present invention, with (a) showing in general the frame configuration in the ATM transmission system, and (b) showing the case in which an intra-office tag is added;

FIG. 3 is a drawing which shows the second embodiment of the present invention, with (a) showing in general the frame configuration in the ATM transmission system, and (b) showing the case in which an intra-office tag is added;

FIG. 13 is a drawing which shows the transmission alarms detected at each point shown in FIG. 12.

DESCRIPTION OF THE PREFERRED EMBODIMENT

Before describing the embodiments of the present invention, the related art and the disadvantages therein will be described, with reference made to the related accompanying drawings.

Figure 11:
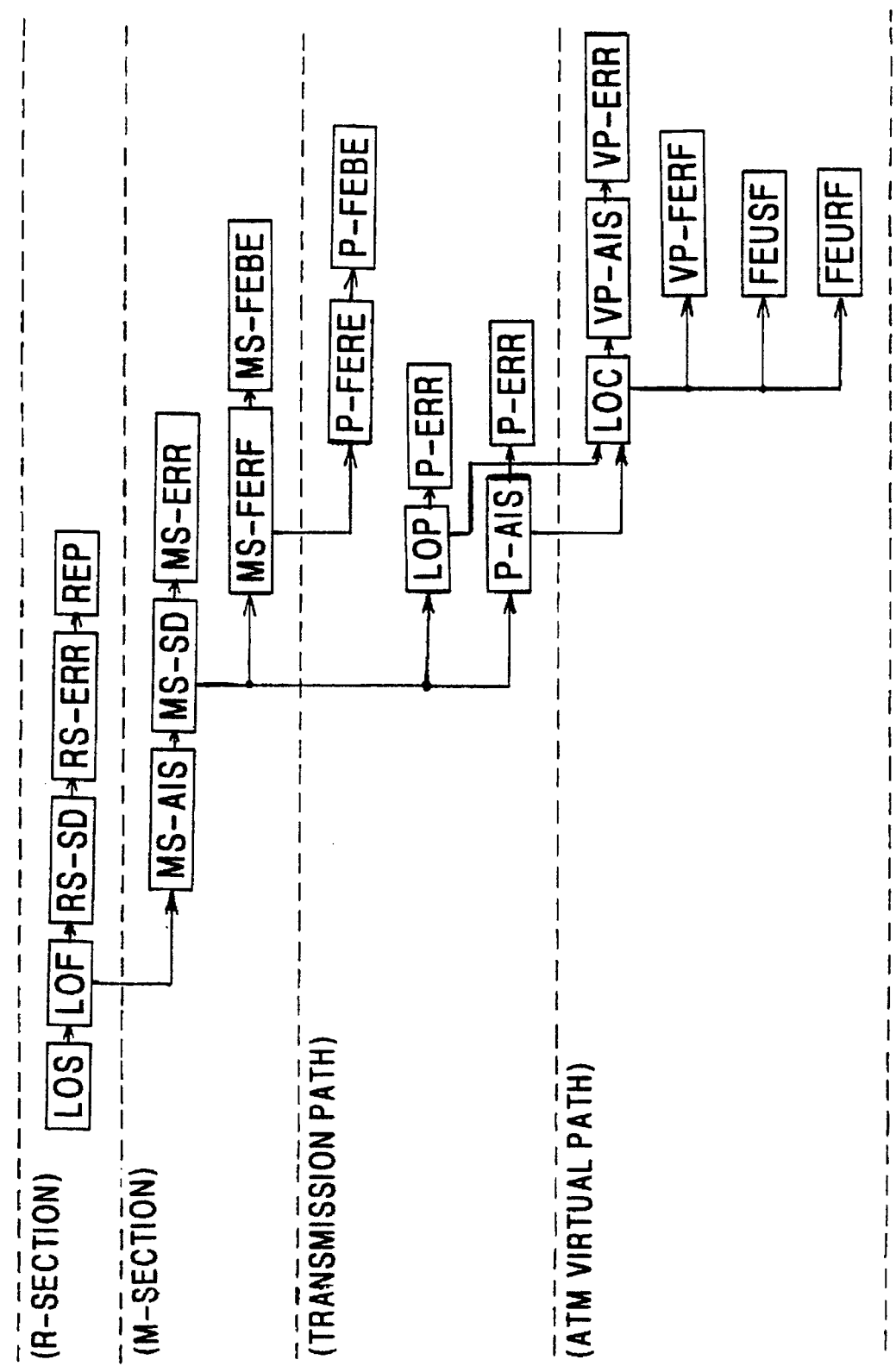
FIG. 11 is a drawing which shows the ATM transmission alarms and the priority sequence thereof.

FIG. 11 shows the ATM transmission alarms and the priority sequence thereof, this drawing illustrating, for the various hierarchal layers of the R section (regenerator-repeater section), M section (multiplex section), transmission path, and ATM virtual path (VP), the manner in which the priority level decreases from a high-priority alarm (higher level alarm) toward a low-priority alarm (lower level alarm), in the direction indicated by the arrows in this drawing.

In this drawing, LOS denotes loss of signal, LOF denotes loss of frame synchronization, RS-SD denotes regenerator section signal degradation, RS-ERR denotes regenerator section error alarm, REP denotes repeater alarm, MS-AIS denotes multiplex section alarm indication signal, MS-SD denotes multiplex section signal degradation, and MS-ERR denotes multiplex section error alarm.

In the same drawing, MS-FERF denotes multiplex section far-end receive failure, MS-FEBE denotes multiplex section far-end block error, LOP denotes loss of pointer, P-ERR denotes transmission path error alarm, P-AIS denotes transmission path alarm indication signal, P-FERF denotes path far-end receive failure, and P-FEBE denotes transmission path far-end transmission end block error.

LOC denotes loss of cell synchronization, VP-AIS denotes virtual path alarm indication signal, VP-ERR denotes virtual path error alarm, VP-FERF denotes virtual path far-end receive failure, FEUSF denotes far-end user send failure, and FEURF denotes far-end user receive failure.

In general in ATM transmission equipment, because termination is provided as far as the TP (transmission path) layer, alarms as far as the TP layer are detected at the reception end. On the other hand, VP (VC: virtual channel layer) alarms are detected as much as possible at the network termination (transmission side in ATM transmission equipment).

Figure 12:
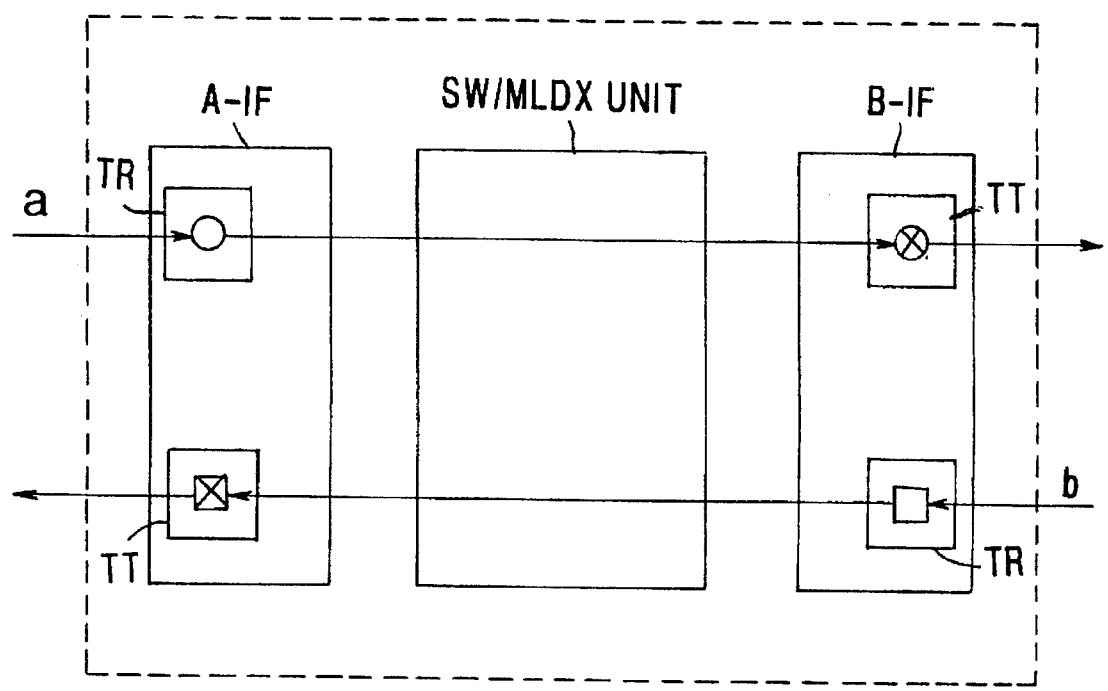
FIG. 12 is a drawing which shows transmission alarm detecting points in ATM transmission equipment.

FIG. 12 shows the transmission path alarm detection points in ATM transmission equipment, this being used to illustrate the SW/MLDX unit which performs cross connection, multiplexing, and demultiplexing, and the alarm detection points at interface units A-IF and B-IF positioned before and after this SW/MLDX unit. In this drawing, the ○ and the ⊗ denote the reception part and the transmission part, respectively, of the transmission path a, and the □ and the ▨ denote the reception part and the transmission part, respectively, of the transmission path b. FIG. 13 shows the transmission path alarms detected at each of the points shown in FIG. 12.

With the exception of VP related alarms, the transmission path alarms on the transmission path a, in accordance with the associated alarm detection point arrangement, as shown in FIG. 13, are detected at the ○ point of the interface A-IF. VP related alarms are detected at the ⊗ point of the interface B-IF. In the same manner, with the exception of VP related alarms, the transmission path alarms on the transmission path b are detected at the ∈ point of the interface B-IF. VP related alarms are detected at the ▨ point of the interface A-IF. With regard to transmission path alarms, in accordance with priority processing, as described above, secondary alarms are masked by primary alarms. Therefore, with regard to transmission path a, VP related alarms which are detected at the ⊗ point must be masked if there is a higher priority alarm (alarm other than a VP related alarm) detected at the ○ point. The same is true with regard to transmission path b.

The above-noted "reception end" and "transmission end" indicate the reception termination end and the transmission termination end of each network hierarchy level (layer). That is, from the view point of network hierarchy, these are the reception facility and transmission facility of each layer.

Figure 14:
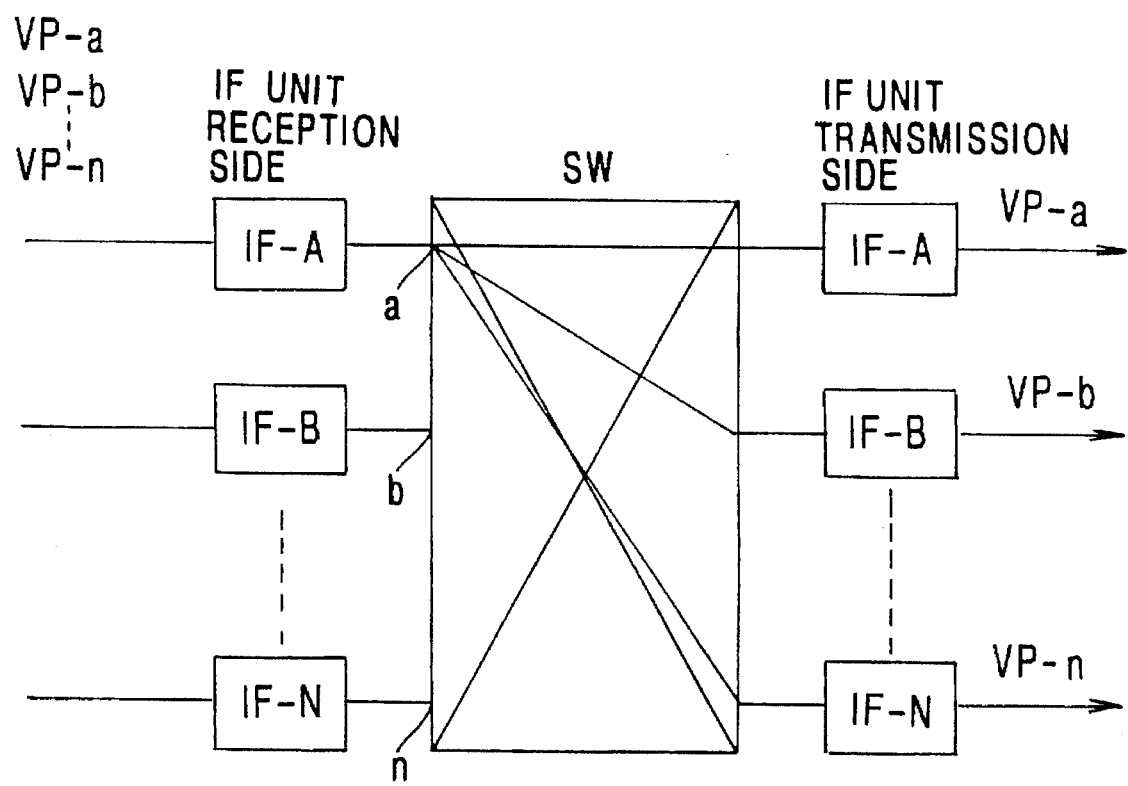
FIG. 14 is a drawing which illustrates the switching of alarms in a switching unit.

Additionally, the above-noted "reception end" and "transmission end" (FIG. 12) are the logical representations of the reception part and the transmission part of the transmission path in the equipment, and from the view point of the transmission path, these are the receiving facility and the transmission facility. FIG. 12 shows the reception part and the transmission part of the transmission path in the form of a diagram showing the physical equipment configuration. In general, an interface panel has mounted on it the transmission path reception facility and the transmission path transmission facility. To express this drawing of the physical configuration in a logical sense, the drawing which shows the interface unit reception part to the left of the switching unit and which shows the interface unit transmission part to the right of the switching unit is FIG. 1, which is described later, each of these being shown as the reception side interface unit and the transmission side interface unit (FIG. 1) or the IF unit reception side and IF unit transmission side (FIG. 14). The above-noted reception part and reception side interface unit or IF unit reception side correspond to the transmission path reception facility TR in FIG. 12, while the above-noted transmission part and transmission side interface unit or IF unit transmission side correspond to the transmission path transmission facility TR in FIG. 12.

An alarm cell is a cell for the purpose notifying other equipment of failure information for the VP (VC) layer (VP-AIS/VP-FERF/FEUSF/FEURF or VC-AIS/VC-FERF). The contents of this cell are set forth in detail by the ITU-T recommendation I.610 as an AIS/FERF fault management cell. FEUSF and FEURF, however, are data outside of scope of I.610. A monitor cell is a cell for the purpose of notifying other equipment of monitor information for the VP (VC) layer (user cell BIP (bit-interleaved parity)). At a piece of equipment which receives this information, the BIP of the user cell is calculated, a comparison is performed between the calculated BIP and the BIP in the monitor cell, and if these differ the judgment is made that a bit error (VP-ERR/VC-ERR) has occurred on the transmission path. The contents of this cell are set forth in detail by the ITU-T recommendation I.610 as a performance management cell.

A general method for achieving the above-noted type of alarm masking is to use firmware (software), whereby in the case in which a higher level alarm is detected at the reception side/circle point, an alarm which is detected at the transmission side/circle point is masked. However, because alarm cells and monitor cells are distributed to a plurality of IFs by means of VPI conversion (routing), it is necessary to search for the destination VP (VC) for each VP (VC), and to mask all related masks. For this reason, the amount of processing required is huge, making this unimplementable in practice.

For the purpose of resolving the shortcomings of the prior art, the present invention provides an alarm masking processing system for use in ATM transmission equipment, wherein when a high-priority alarm occurs or when the corresponding alarm is inhibited, intra-office tags are added to alarm cells (monitor cells), thereby enabling these intra-office tags to be used to establish whether the alarm is to be detected at the alarm detection unit, thus enabling the implementation of the intended alarm masking processing. There are nine modes, (1) to (9), of implementing the present invention, these being described below.

Figure 1:
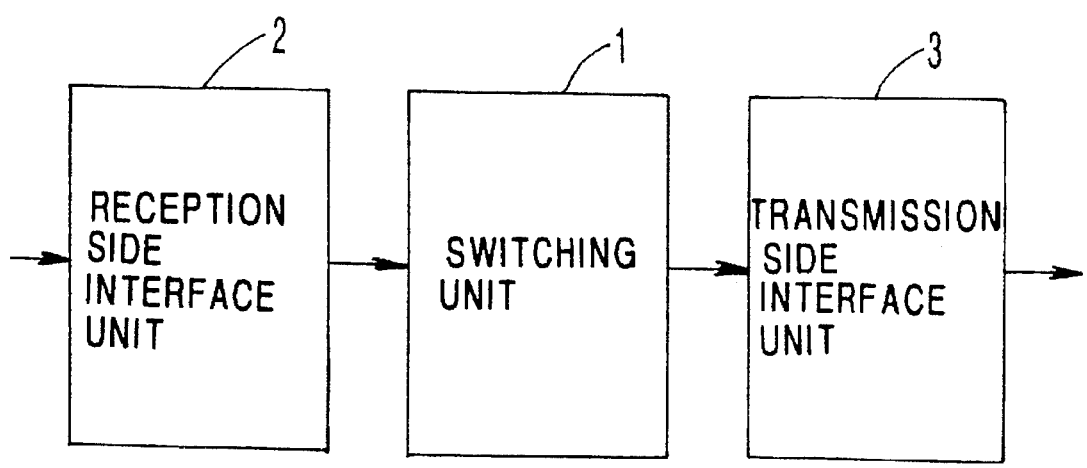
FIG. 1 is a drawing which shows the principle of the present invention.

FIG. 1 is a drawing which illustrates the principle of the present invention.

(1) In a reception side interface unit 2 of an ATM equipment having a switching unit 1 that performs switching of virtual paths or virtual channels, when a higher priority alarm is detected or received, an intra-office tag is added to the alarm cell, this intra-office tag being detected at the interface unit 3 of the ATM equipment to inhibit the detection of a lower priority alarm which is generated in response to the higher priority alarm.

(2) In a reception side interface unit 2 of an ATM equipment having a switching unit 1 that performs switching of virtual paths or virtual channels, when a higher priority alarm is detected or received, an intra-office tag is added to the monitor cell, this intra-office tag being detected at the interface unit 3 of the ATM equipment to inhibit the detection of a monitor alarm which is generated in response to the higher priority alarm.

(3) When a failure occurs in an interface panel which includes a reception side interface unit 2 and a transmission side interface unit 3 in an ATM equipment which has a switching unit 1 that performs switching of virtual paths and virtual channels, an intra-office tag is added to the alarm cell at the reception side interface unit before transmission, this intra-office tag being detected in the transmission side interface unit, thereby inhibiting the detection of alarms which are generated in response to the failure.

(4) When a failure occurs in an interface panel which includes a reception side interface unit 2 and a transmission side interface unit 3 in an ATM equipment which has a switching unit 1 that performs switching of virtual paths and virtual channels, at the reception side interface unit 2 an intra-office tag is added to the monitor cell and an intra-office tag is added to the alarm cell before transmission, this intra-office tag being detected in the transmission side interface unit 3, thereby inhibiting the detection of monitor alarms which are generated in response to the failure. The interface panel in this case is an interface board (printed circuit board) which holds the interface.

(5) In each reception side interface unit 2 in ATM equipment which has a switching unit 1 that performs switching of virtual paths and virtual channels, based on an command from host equipment or other equipment an intra-office tag is added to a corresponding alarm cell before transmitting it, this intra-office tag being detected at the transmission side interface unit 3, thereby inhibiting the detection of the alarm.

(6) In each reception side interface unit 2 in ATM equipment which has a switching unit 1 that performs switching of virtual paths and virtual channels, based on an command from host equipment or other equipment an intra-office tag is added to a corresponding monitor cell before transmitting it, this intra-office tag being detected at the transmission side interface unit 3, thereby inhibiting the detection of the monitor alarm.

(7) In each of the above-noted implementation modes (1) to (6), the definition of the HEC region in the ATM frame overhead in the equipment as a reserved region.

(8) In each of the above-noted implementation modes (1) to (6), the definition of an intra-office tag in a reserved region produced by increasing the transfer rate inside the equipment.

(9) In each of the above-noted implementation modes (1) to (6) the definition of an intra-office tag in a reserved region by reserving the SDH frame overhead inside the equipment.

The operation of the above-noted implementation modes is described in (1) through (9) below.

(1) In ATM transmission equipment, a virtual path or a virtual channel received via a reception side interface unit 2 is switched by a switching unit 1 and then transmitted via a transmission side interface unit 3.

In this case, in the reception side interface unit 2, if a send error is detected or if an alarm is received from the transmission path, if this alarm has a high priority (LOS, LOF, MS-AIS, MS-SD, LOP, P-AIS, or LOC), an intra-office tag is added to the alarm cell, and transmission is made via the switching unit 1 to the transmission side interface unit 3.

At the transmission side interface unit 3 which receives the alarm cell, by detecting the associated intra-office tag, the detection of lower priority alarms (VP-AIS, VP-FERF, FEUSF, or FEURF) which are generated as secondary alarms in response to the higher priority alarm is inhibited.

Therefore, according to the present invention, it is possible to perform alarm priority processing in an ATM network, whereby lower priority alarms which are generated in response to higher priority alarms are masked.

(2) In ATM transmission equipment, a virtual path or a virtual channel received via a reception side interface unit 2 is switched by a switching unit 1 and then transmitted via a transmission side interface unit 3.

In this case, in the reception side interface unit 2, if a send error is detected or if an alarm is received from the transmission path, if this alarm has a high priority (LOS, LOF, MS-AIS, MS-SD, LOP, P-AIS, or LOC), an intra-office tag is added to the monitor cell, and transmission is made via the switching unit 1 to the transmission side interface unit 3.

At the transmission side interface unit 3 which receives the monitor cell, by detecting the associated intra-office tag, the detection of a monitor alarm (VP-ERR) which is generated as a secondary alarm in response to the higher priority alarm is inhibited.

Therefore, according to the present invention, it is possible to perform alarm priority processing in an ATM network, whereby monitor alarms which are generated in response to higher priority alarms are masked.

(3) In ATM transmission equipment, a virtual path (VP) received via a reception side interface unit 2 is switched by a switching unit 1 and then transmitted via a transmission side interface unit 3.

In this case, in the reception side interface unit 2, if a failure occurs in an interface board which includes a reception side interface unit 2 and a transmission side interface unit 3, at the reception side interface unit 2 an intra-office tag is added to the alarm cell, and transmission is made via the switching unit 1 to the transmission side interface unit 3.

At the transmission side interface unit 3 which receives the alarm cell, by detecting the associated intra-office tag, the detection of alarms which are generated in response to the failure (VP-AIS, VP-ERR, VP-FERF, FEUSF, and FEURF) is inhibited.

Therefore, according to the present invention, it is possible to perform alarm priority processing in an ATM network, whereby monitor alarms which are generated in response to a failure are masked.

(4) In ATM transmission equipment, a virtual path (VP) received via a reception side interface unit 2 is switched by a switching unit 1 and then transmitted via a transmission side interface unit 3.

In this case, in the reception side interface unit 2, if a failure occurs in an interface panel which includes a reception side interface unit 2 and a transmission side interface unit 3, at the reception side interface unit 2 an intra-office tag is added to the alarm cell, an intra-office tag is added to the monitor cell, and transmission is made via the switching unit 1 to the transmission side interface unit 3.

At the transmission side interface unit 3 which receives the alarm cell and the monitor cell, by detecting the associated intra-office tags, detection of the monitor alarm which is generated in response to the failure (VP-ERR) is inhibited.

Therefore, according to the present invention, it is possible to perform alarm priority processing in an ATM network, whereby monitor alarms which are generated in response to a failure are masked.

(5) In ATM transmission equipment, a virtual path (VP) received via a reception side interface unit 2 is switched by a switching unit 1 and then transmitted via a transmission side interface unit 3.

In this case, in the reception side interface unit 2, in accordance with an command from host equipment or other equipment, an intra-office tag is added to the corresponding alarm cell, and transmission is made via the switching unit 1 to the transmission side interface unit 3.

At the transmission side interface unit 3 which receives the alarm cell and the monitor cell, by detecting the associated intra-office tag, detection of the corresponding alarm is inhibited.

Therefore, according to the present invention, it is possible to perform alarm inhibit processing in an ATM network, whereby alarms are masked in accordance with a inhibit information from host equipment or other equipment.

(6) In ATM transmission equipment, a virtual path (VP) received via a reception side interface unit 2 is switched by a switching unit 1 and then transmitted via a transmission side interface unit 3.

In this case, in the reception side interface unit 2, in accordance with an command from host equipment or other equipment, an intra-office tag is added to the corresponding monitor cell, and transmission is made via the switching unit 1 to the transmission side interface unit 3.

At the transmission side interface unit 3 which receives the monitor cell, by detecting the associated intra-office tag, detection of the corresponding monitor alarm is inhibited.

Therefore, according to the present invention, it is possible to perform alarm inhibit processing in an ATM network, whereby monitor alarms are masked in accordance with a inhibit information from host equipment or other equipment.

(7) In any of the cases (1) to (6) described above, the addition of an intra-office tag can be performed by serving an HEC region in the ATM frame overhead, and defining the intra-office tag in this reserved region.

(8) In any of the cases (1) to (6) described above, the addition of an intra-office tag can be performed by defining an intra-office tag in a reserved region which is produced by increasing the transfer rate inside the equipment.

(9) In addition, in any of the cases (1) to (6), the addition of an intra-office tag can be performed by reserving the SDH frame overhead within the equipment and then defining an intra-office tag in that reserved region.

The embodiments of the present invention will be described below.

FIG. 2 shows the first embodiment of the present invention, in which (a) provides a general view of the frame ATM transmission system frame configuration, and (b) shows the case in which an intra-office tag is added. In this embodiment, the method (1) of providing an intra-office tag region inside the equipment is shown, the embodiment also showing the method of using the HEC (header error control) region provided in the overhead (OH region) for the purpose of performing header error control.

In the OH area, GFC denotes general flow control, VPI denotes a virtual path identifier, VCI denotes a virtual channel identifier, PT denotes a payload type indicator, and CLP denotes cell loss priority. The payload, which is used for the transfer of data, is composed of 48 bytes.

The HEC region is provided for the purpose of error compensation and synchronization, and is not required within the equipment if error detection and correction at the reception end of the equipment are performed simultaneously with establishment of synchronization.

Inside the equipment shown in FIG. 2 this region can be used as a reserved region, this being used for communications within the equipment. Therefore, by defining an intra-office tag within this reserved region, it is possible to perform communications between the reception end and the transmission end, for the purpose of alarm masking.

FIG. 3 shows the second embodiment of the present invention, in which (a) provides a general view of the frame ATM transmission system frame configuration, and (b) shows the case in which an intra-office tag is added. In this embodiment, the method (2) of providing an intra-office tag region inside the equipment by increasing the transfer rate inside the equipment.

By making the transfer rate within the equipment faster than the transfer rate between the equipment and external equipment, it is possible to transfer a greater amount of data within the equipment. The free area which results from increasing the transfer rate within the equipment can be used as a reserved area, this being usable for communications within the equipment.

For example, if the transfer rate between the equipment and external equipment is 155.52 Mb/s, by setting the internal transfer rate to 158.4543396 Mb/s (=155.52×54/53), with respect to 53 bytes of ATM cells external to the equipment, as shown in FIG. 3 at (b), it is possible to create one byte of reserve region inside the equipment. Therefore, by defining an intra-office tag in this reserved region, it is possible to perform communications between the reception end and the transmission end for the purpose of alarm masking. In addition, at the transmission end the transfer rate is restored to the original transfer rate.

Next, the third embodiment of the present invention, which used the OH (overhead) area of the SDH system will be described next. This embodiment uses method (3) of providing an intra-office tag region inside the equipment.

A general method of transferring an ATM cell is that of causing it to ride on top of an existing SDH frame. In ATM equipment, because SDH is terminated, it is not necessary to pass the SDH-OH data through the equipment, this data being unnecessary within the equipment, enabling this unneeded region to be used as a reserved region which is usable for communications within the equipment.

By assigning one byte of the region per ATM cell, it is possible, as shown in FIG. 3, to establish one byte of the reserved region for each ATM cell. Therefore, by defining an intra-office tag in this reserved region, it is possible to use this for the communications between the reception end and the transmission end for the purpose of alarm masking.

Figure 4C:
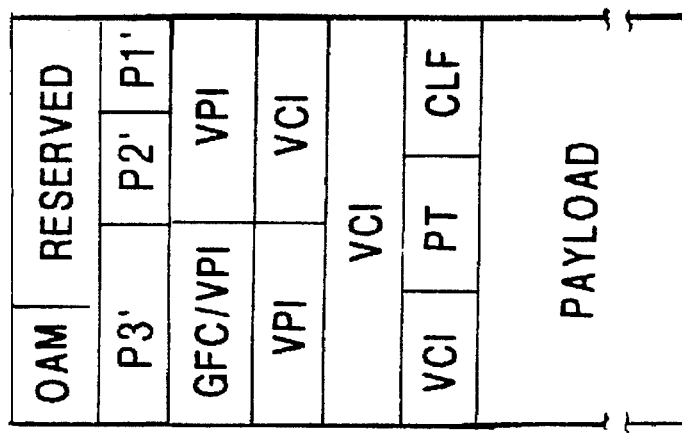
FIG. 4 is a drawing which shows an example of the present invention, with (a) showing in general the frame configuration in the ATM transmission system, and (b) and (c) showing the cases in which an intra-office tag and a port identifier is added.
Figure 4B:
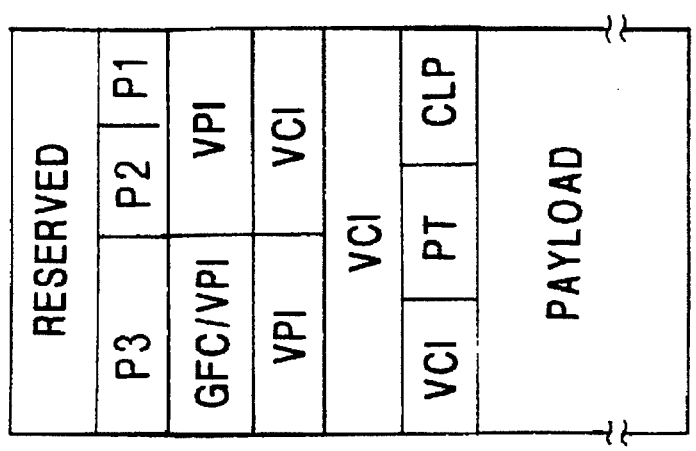
Figure 4A:
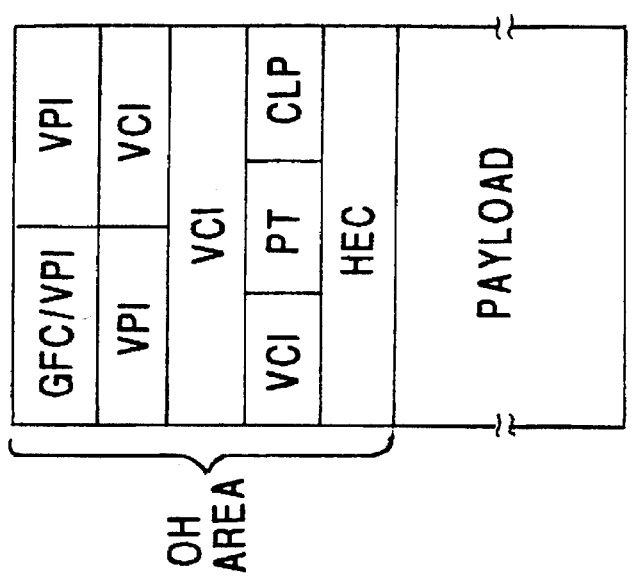

It is additionally possible to embody the present invention by a combination of the above-described methods (1) to (3). FIG. 4 shows an example of the present invention, in which (a) shows in general the frame configuration in the ATM transmission system, and (b) and (c) show the cases in which an intra-office tag and a port identifier is added. In this example, the above-described methods (1) and (3) are combined.

In FIG. 4, one byte region each is established by applying the methods (1) and (3), for a total region of two bytes established. In the case of (b), one byte is used as reserve bits, and the other byte is used as port identifiers (p3, p2, p1) for the purpose of identifying the input port (a, b, . . . , n in FIG. 14). In the case of (c), one byte is used as both OAM (operation and management) bits and reserve bits, while the other one byte is used as port identifiers (p3', p2', p1') for the purpose of identifying the input port (a, b, . . . , n in FIG. 14).

Figure 5:
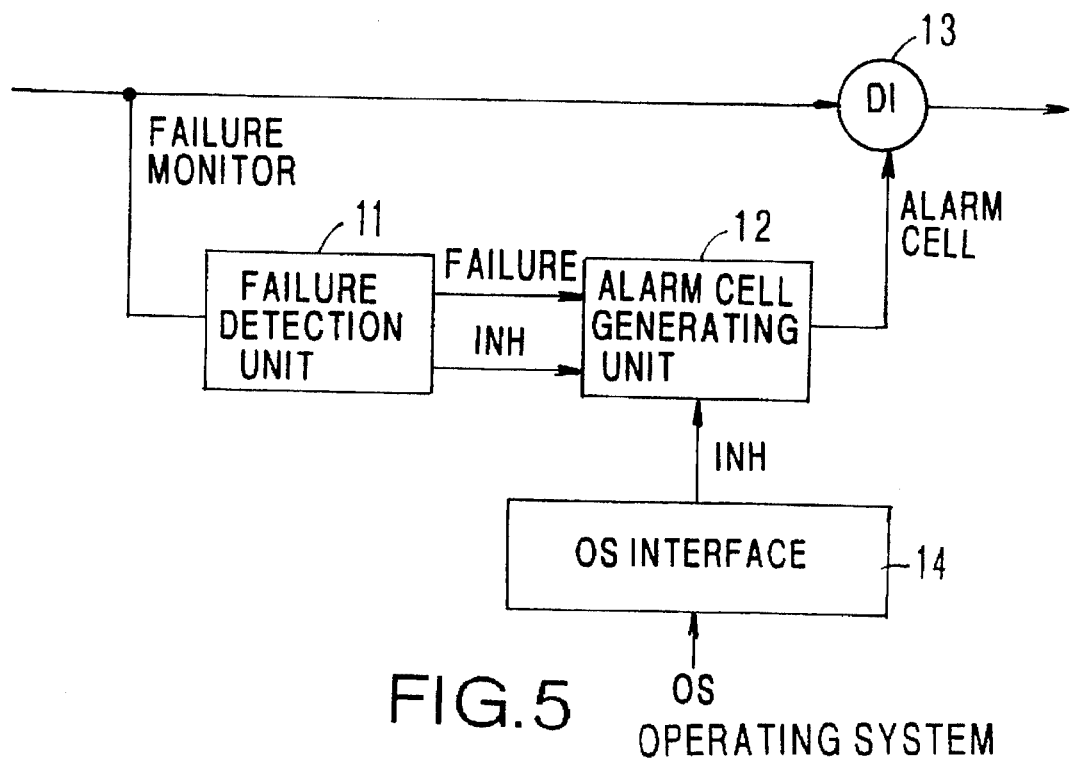
FIG. 5 is a drawing which shows the fourth embodiment of the present invention.

FIG. 5 shows the fourth embodiment of the present invention, which shows the first configuration example of the intra-office tag at the reception end, for the case in which an intra-office tag is added to an alarm cell generated internally in the equipment. In this figure, the reference number 11 denotes a failure detection unit which detects a failure in the receiving transmission path, 12 is an alarm cell generating unit which generates an alarm cell which is to be transmitted, 13 is a drop and insert unit DI which drops and inserts an alarm cell, and 14 is an OS interface which provides an interface to the operating system.

The failure detection unit 11 detects failures in the receiving transmission path, such as LOS, LOF, MS-AIS, LOP, P-AIS, and LOC. In the case in which a failure satisfies the conditions for generation of an alarm cell, the failure detection unit 11 notifies the alarm cell generating unit of the failure, the latter unit generating the corresponding alarm. When the failure detection unit 11 detects a failure for which an alarm should be generated which has priority over an alarm generated at the alarm cell generating unit 12, an inhibit signal INH is sent to the alarm cell generating unit 12. When the alarm cell generating unit 12 receives the inhibit signal INH, when generating an alarm cell, the intra-office tag in the OH reserve region for the alarm cell is sent as "1". At the failure detection unit 11, in the case in which only failures which should cause generation of an alarm which has a higher priority only an alarm which is generated at the alarm cell generating unit 12, the inhibit signal INH is unneeded, and when the alarm cell generating unit 12 receives an alarm notification it is sufficient to set all the intra-office tags to "1". The alarm cell is inserted in place of a normal cell by the drop and insert unit 13, by means of a drop and insert function. In addition, a normal cell does not necessarily need to be dropped. The detail are as follows.

In the case of an alarm cell (VP-AIS/VC-AIS) for a transmission path failure such as LOS or LOF, for which notification is made in the normal direction, because the associated VP/VC has failed, an abnormal cell will be sent out, so that it is desirable to drop this normal cell to prevent influencing other VPs/VCs. However, in the case of an alarm cell (VP-ERR/VC-ERR) caused by detection of VP-AIS/VC-AIS for which notification is made in the reserve direction, since the associated VP/VC has not failed, the normal cell is not dropped. Attention is directed to ITU-T recommendation I.610 in this regard. Here, either method can be used.

In the case in which there is an alarm inhibit command from the operating system for an individual INH, or HW (highway)—ALM (alarm)—INH or the like, this command is interpreted at the OS interface 14, and the inhibit signal INH is sent to the alarm generating unit 12. When this inhibit signal INH is received by the alarm generating unit 12, regardless of the INH signal from the failure detection unit 11, the intra-office tag in the internal OH reserved region for the alarm cell is sent as "1". This method is effective in the case in which an intra-office tag is added to an alarm cell which is generated within the equipment.

Figure 6:
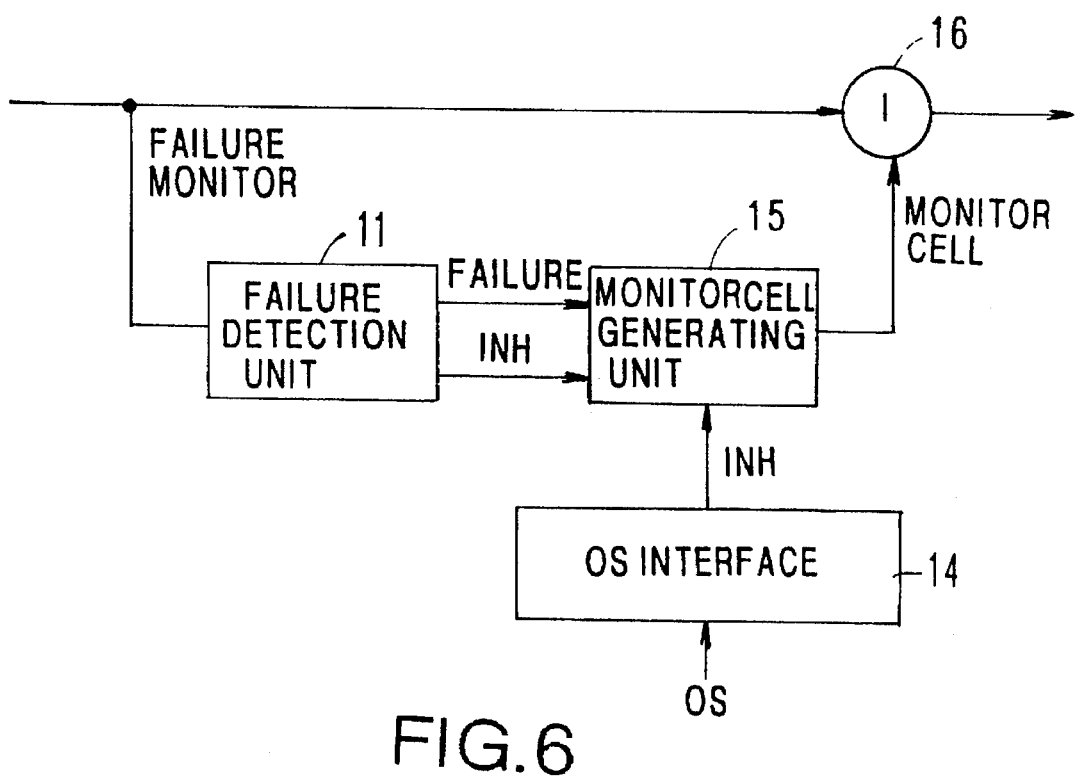
FIG. 6 is a drawing which shows a variation on the fourth embodiment of the present invention.

FIG. 6 show the a variation on the fourth embodiment of the present invention, in which elements the same as shown in FIG. 5 are assigned the same reference numerals, and in which 15 denotes a monitor cell generating unit which generates a monitor cell to be sent, and 16 is an insertion unit I which performs cell insertion.

The variation on the fourth embodiment which is shown in FIG. 6 shows the example of adding an intra-office tag to the monitor cell rather than to the alarm cell as is done in the embodiment shown in FIG. 5, the operation in the case being similar to the operation in the case of FIG. 5.

Figure 7A:
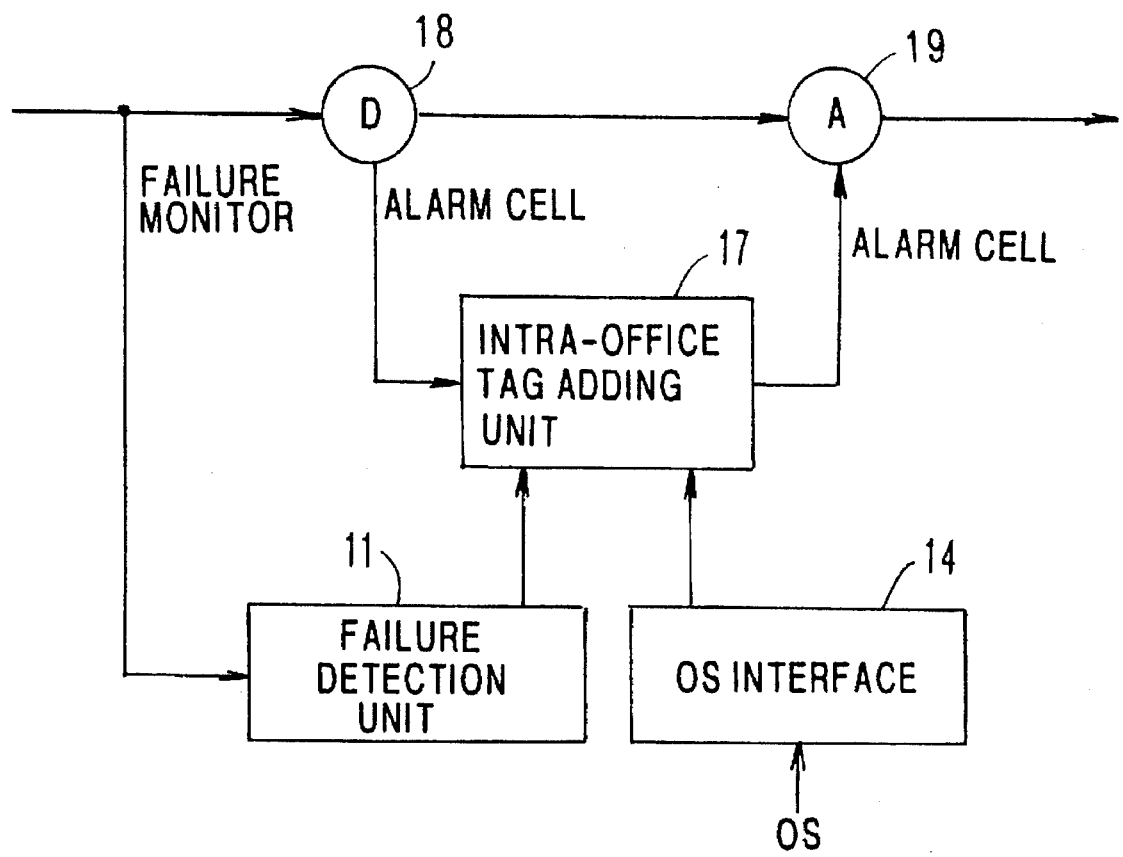
FIG. 7A is a drawing which shows the fifth embodiment of the present invention.

FIG. 7A shows the fifth embodiment of the present invention, which shows the second configuration example of the intra-office tag at the reception end, for the case in which an intra-office tag at the reception end, in which 17 denotes an intra-office tag adding unit, 18 is a drop unit (D) which splits cells, and 29 is an adding unit (A) which performs cell addition.

The failure detection unit 11 detects receiving path failure such as LOS, LOF, MS-AIS, LOP, P-AIS, and LOC. In the case in which the failure detection unit 11 detects a failure which should generate an alarm having priority over an alarm generated by the alarm cell generating unit, the intra-office tag adding unit 17 is notified of the failure. At the intra-office tag adding unit 17, if the failure detection unit has given notice of an alarm with respect to an alarm cell dropped by the drop function of the drop unit 18, when the alarm cell is generated, the intra-office tag at the internal OH reserve region of the alarm cell is sent as "1". The alarm cell is combined with a normal cell at the adding unit 19.

If there is, from the operating system, an individual INH, or HW (highway)—(alarm)—INH or the like, this command is interpreted at the OS interface 14, and the inhibit signal INH is sent to the intra-office tag adding unit 17. When this inhibit signal INH is received by the intra-office tag adding unit 17, regardless of the INH signal from the failure detection unit 11, the intra-office tag in the internal OH reserved region for the alarm cell is sent as "1". This method is effective in the case in which an intra-office tag is added to an alarm cell which is generated external to the equipment. However, by providing this block, it is also usable in the case in which, after the insertion of an alarm cell generated by the alarm cell generating unit, an intra-office tag is added to an alarm cell generated internally in the equipment.

Figure 7B:
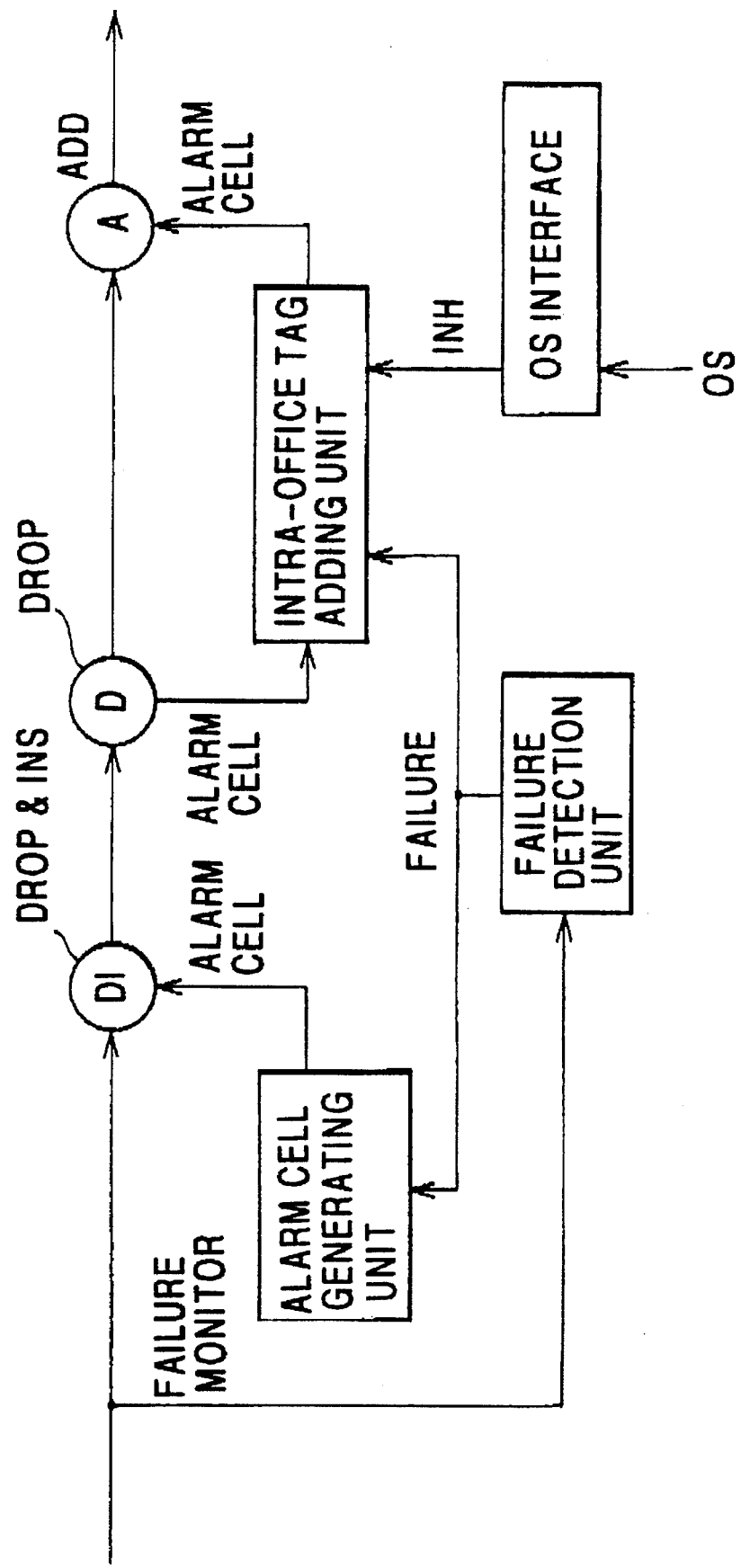
FIG. 7B is a drawing which illustrates the method of adding an intra-office tag after the generation of an alarm.

The "block" referred to above is the intra-office tag adding unit. The above-noted comment with regard to the provision of that block indicates (and is the same with regard to FIG. 7A and FIG. 8) that, by providing between the failure monitoring point (signal dividing point to the drop unit 18 and the failure detection unit 11) and the drop unit 18 an alarm cell generating unit 12 (or monitor cell generating unit 15), it is possible to implement a function equivalent to FIG. 5 (or FIG. 6). This is illustrated in FIG. 7B.

Figure 8:
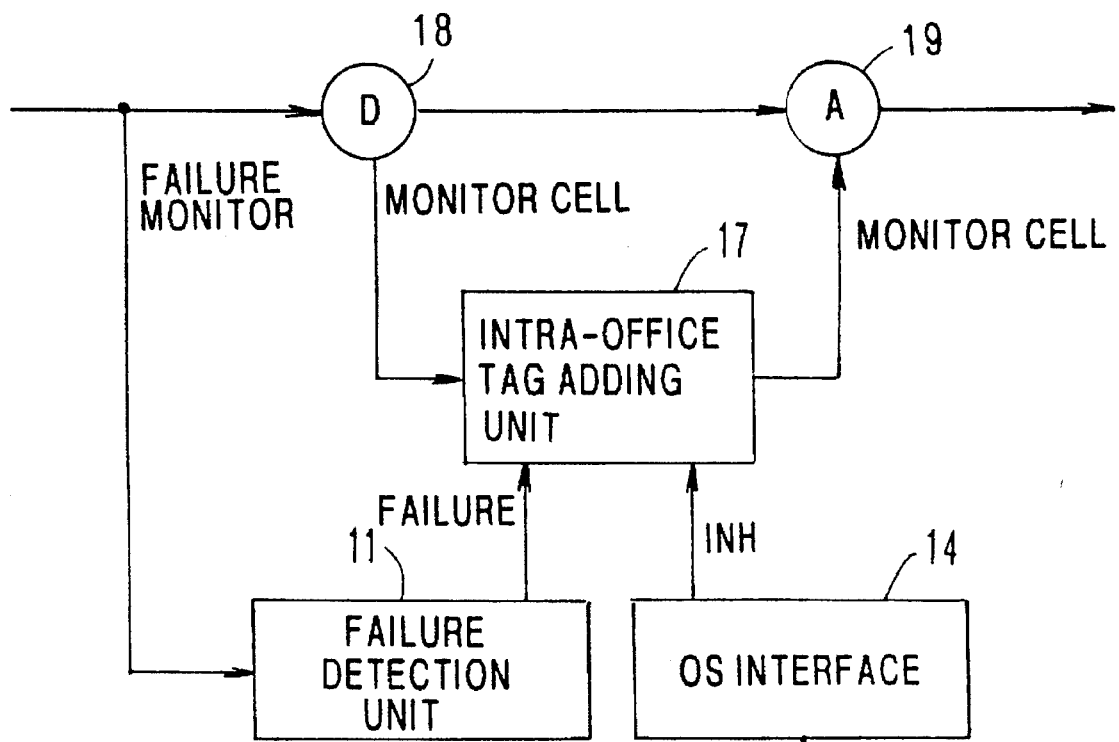
FIG. 8 is a drawing which shows a variation on the fifth embodiment of the present invention.

FIG. 8 shows a variation on the fifth embodiment of the present invention, in which elements that are the same as shown in FIG. 7 are assigned the same reference numerals.

In the variation shown in FIG. 8, instead of adding an intra-office tag to the alarm cell as in FIG. 7, the intra-office tag is added to the monitor cell, the operation in this case being similar to the case shown in FIG. 7.

Figure 9:
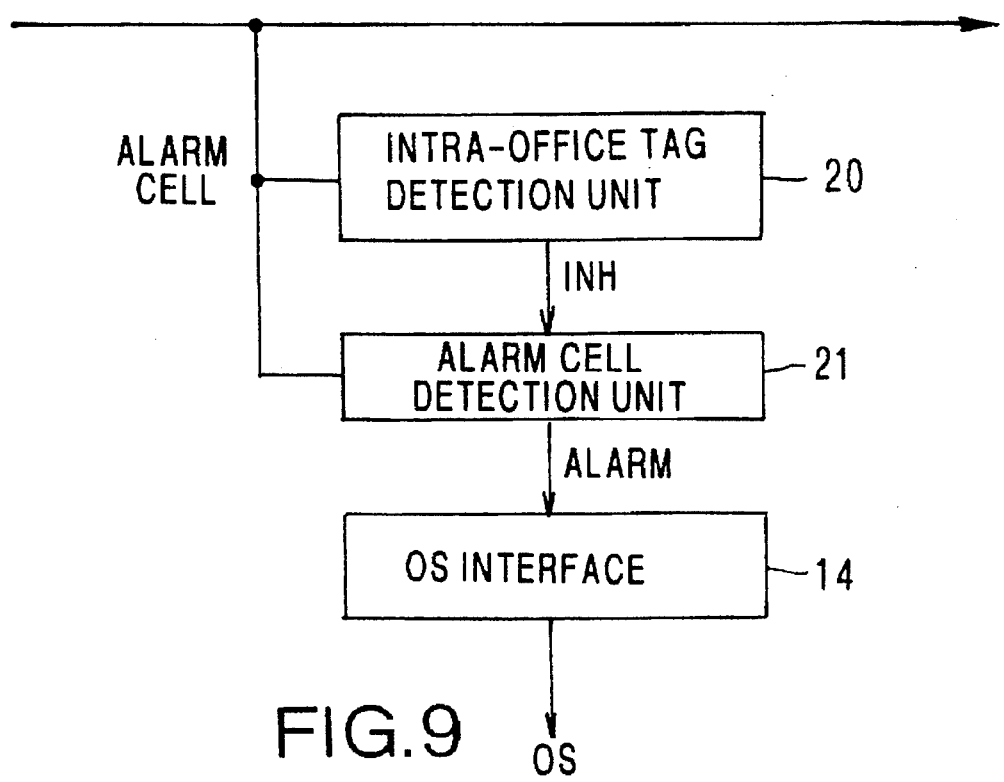
FIG. 9 is a drawing which shows the sixth embodiment of the present invention.

FIG. 9 shows the sixth embodiment of the present invention, which shows an example of the configuration of an intra-office tag detection unit, in which 20 is an intra-office tag detection unit which detects an intra-office tag which is added to an alarm cell, and 21 is an alarm cell detection unit which detects an alarm cell from the received signal.

The intra-office tag detection unit 20 monitors alarm cells from the received signal, and when an alarm cell having an intra-office tag of "1" is detected, it sends an INH signal to the alarm cell detection unit 21. At the alarm cell detection unit 21, when an alarm cell is detected from the received signal, a notification of that alarm is sent via the OS interface 14 to the operating system, and when the INH signal is received from the intra-office tag detection unit, the alarm notification to the operating system is inhibited.

Figure 10:
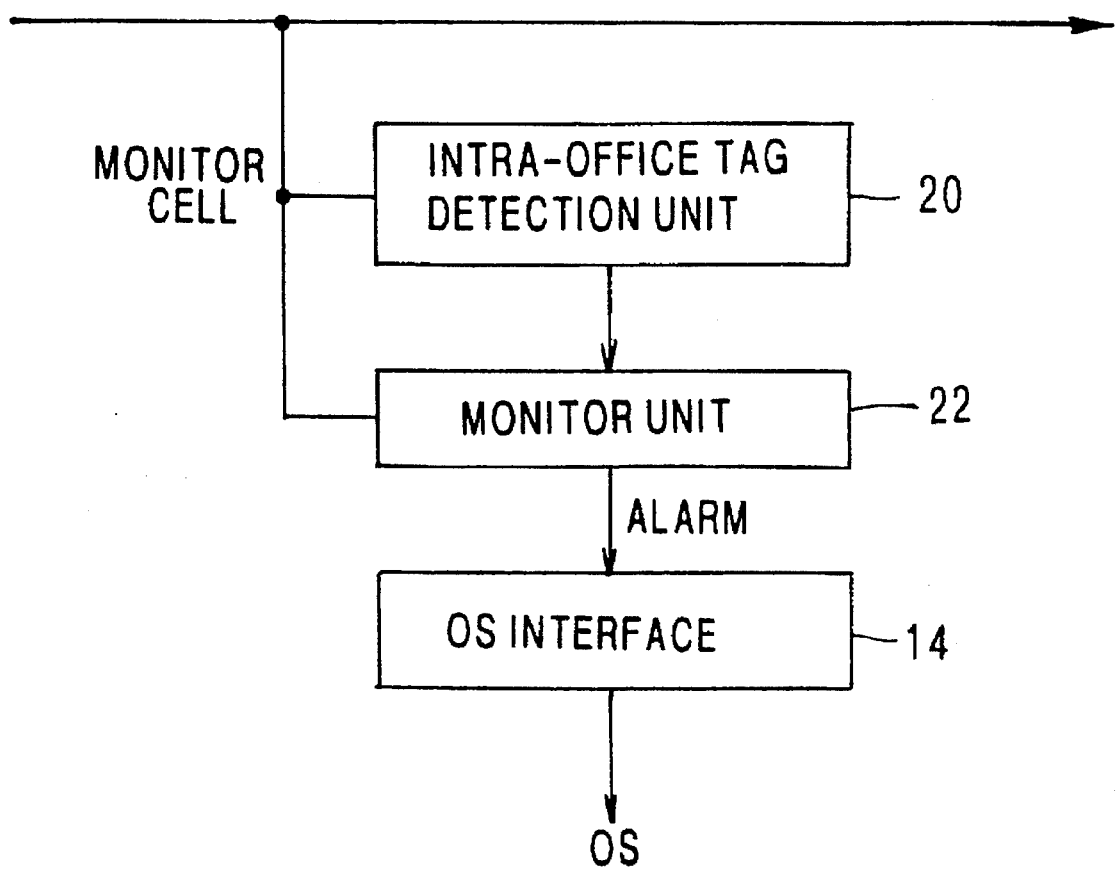
FIG. 10 is a drawing which shows a variation on the sixth embodiment of the present invention.

FIG. 10 shows a variation on the sixth embodiment of the present invention, in which elements that are the same as in FIG. 9 are assigned the same reference numerals, and in which 22 denotes a monitor unit which detects monitor cells from the received signal.

In the variation which is shown in FIG. 10, instead of adding an intra-office tag to the alarm cell as in FIG. 9, the intra-office tag is added to the monitor cell, the operation in this case being similar to the case shown in FIG. 9.

According to the present invention as described above, in ATM transmission equipment, when an alarm having high priority occurs, or when the corresponding alarm is inhibited, by adding an intra-office tag to the alarm cell (or to the monitor cell) at the transmission part, it is possible to utilize this intra-office tag to establish whether or not an alarm (or monitor alarm) having a low priority will be detected at the alarm detection unit of the receiving part, thus enabling implementation of the intended alarm priority processing or alarm inhibit processing.

What is claimed is:

1. A system for achieving an alarm masking processing cooperating with a reception side interface unit and a transmission side interface unit of an ATM transmission equipment which includes a switching unit for switching virtual paths or virtual channels, wherein said system is operative when the reception side interface unit detects or receives an alarm having a higher priority level, to add an intra-office tag to an alarm cell and send out said same, and is further operative, in the transmission side interface, to detect said intra-office tag so as to inhibit the detection of an alarm having a lower priority level which is generated in response to said alarm having a higher priority level.

2. A system for achieving an alarm masking processing according to claim 1, wherein said intra-office tag is defined in a reserved area, said reserved area being formed within said ATM transmission equipment by reserving an HEC region in an overhead section.

3. A system for achieving an alarm masking processing according to claim 1, wherein said intra-office tag is defined in a reserved area which is produced by increasing the transfer rate within said ATM transmission equipment.

4. A system for achieving an alarm masking processing according to claim 1, wherein said intra-office tag is defined in a reserved area, said reserved area being formed within said ATM transmission equipment by reserving the overhead of an SDH frame.

5. A system for achieving an alarm masking processing cooperating with a reception side interface unit and a transmission side interface unit of an ATM transmission equipment which includes a switching unit for switching virtual paths or virtual channels, wherein said system is operative when the reception side interface unit detects or receives an alarm having a higher priority level, to add an intra-office tag to an monitor cell and sent out said same, and is further operative, in the transmission side interface, to detect said intra-office tag so as to inhibit the detection of a monitor alarm having a lower priority level which is generated in response to said alarm having a higher priority level.

6. A system for achieving an alarm masking processing according to claim 5, wherein said intra-office tag is defined in a reserved area, said reserved area being formed within said ATM transmission equipment by reserving an HEC region in an overhead section.

7. A system for achieving an alarm masking processing according to claim 5, wherein said intra-office tag is defined in a reserved area which is produced by increasing the transfer rate within said ATM transmission equipment.

8. A system for achieving an alarm masking processing according to claim 5, wherein said intra-office tag is defined in a reserved area, said reserved area being formed within said ATM transmission equipment by reserving the overhead of an SDH frame.

9. A system for achieving an alarm masking processing cooperating with an interface panel which includes a reception side interface unit and a transmission side interface unit of an ATM transmission equipment which includes a switching unit for switching virtual paths or virtual channels, wherein said system is operative when a failure occurs in said interface panel, to add an intra-office tag to an alarm cell at said reception side interface and sent out said same, and is further operative, in the transmission side interface, to detect said intra-office tag so as to inhibit the detection of an alarm which is generated in response to said failure.

10. A system for achieving an alarm masking processing according to claim 9, wherein said intra-office tag is defined in a reserved area, said reserved area being formed within said ATM transmission equipment by reserving an HEC region in an overhead section.

11. A system for achieving an alarm masking processing according to claim 9, wherein said intra-office tag is defined in a reserved area which is produced by increasing the transfer rate within said ATM transmission equipment.

12. A system for achieving an alarm masking processing according to claim 9, wherein said intra-office tag is defined in a reserved area, said reserved area being formed within said ATM transmission equipment by reserving the overhead of an SDH frame.

13. A system for achieving an alarm masking processing cooperating with an interface panel which includes a reception side interface unit and a transmission side interface unit of an ATM transmission equipment which includes a switching unit for switching virtual paths or virtual channels, wherein said system is operative when a failure occurs in said interface panel, to add an intra-office tag to an alarm cell and add an intra-office tag to a monitor cell at said reception side interface and send out said same, and is further operative, in the transmission side interface, to detect said intra-office tag so as to inhibit the detection of an alarm which is generated internally within said ATM transmission equipment.

14. A system for achieving an alarm masking processing according to claim 13, wherein said intra-office tag is defined in a reserved area, said reserved area being formed within said ATM transmission equipment by reserving an HEC region in an overhead section.

15. A system for achieving an alarm masking processing according to claim 13, wherein said intra-office tag is defined in a reserved area which is produced by increasing the transfer rate within said ATM transmission equipment.

16. A system for achieving an alarm masking processing according to claim 13, wherein said intra-office tag is defined in a reserved area, said reserved area being formed within said ATM transmission equipment by reserving the overhead of an SDH frame.

17. A system for achieving an alarm masking processing cooperating with a reception side interface unit and a transmission side interface unit of an ATM transmission equipment which includes a switching unit for switching virtual paths or virtual channels, wherein said system is operative in response to a command from a host equipment or other equipment upon occurrence of an alarm to add an intra-office tag to an alarm cell and send out said alarm cell, and is further operative, in the transmission side interface, to detect said intra-office tag so as to inhibit the detection of another alarm of lower priority level.

18. A system for achieving an alarm masking processing according to claim 17, wherein said intra-office tag is defined in a reserved area, said reserved area being formed within said ATM transmission equipment by reserving an HEC region in an overhead section.

19. A system for achieving an alarm masking processing according to claim 17, wherein said intra-office tag is defined in a reserved area which is produced by increasing the transfer rate within said ATM transmission equipment.

20. A system for achieving an alarm masking processing according to claim 17, wherein said intra-office tag is defined in a reserved area, said reserved area being formed within said ATM transmission equipment by reserving the overhead of an SDH frame.

21. A system for achieving an alarm masking processing cooperating with a reception side interface unit and a transmission side interface unit of an ATM transmission equipment which includes a switching unit for switching virtual paths or virtual channels, wherein said system is operative in response to a command from a host equipment or other equipment to add an intra-office tag to a monitor cell and send out said same, and is further operative, in the transmission side interface, to detect said intra-office tag so as to inhibit the detection of a corresponding monitor alarm.

22. A system for achieving an alarm masking processing according to claim 21, wherein said intra-office tag is defined in a reserved area, said reserved area being formed within said ATM transmission equipment by reserving an HEC region in an overhead section.

23. A system for achieving an alarm masking processing according to claim 21, wherein said intra-office tag is defined in a reserved area which is produced by increasing the transfer rate within said ATM transmission equipment.

24. A system for achieving an alarm masking processing according to claim 21, wherein said intra-office tag is defined in a reserved area, said reserved area being formed within said ATM transmission equipment by reserving the overhead of an SDH frame.

* * * * *

UNITED STATES PATENT AND TRADEMARK OFFICE
CERTIFICATE OF CORRECTION

PATENT NO. : 5,636,206
DATED : 6-3-97
INVENTOR(S) : Shigeo AMEMIYA et al

It is certified that error appears in the above-indentified patent and that said Letters Patent is hereby corrected as shown below:

On the title page, item [73], insert NIPPON TELEGRAPH AND TELEPHONE CORPORATION, TOKYO, JAPAN Signed and Sealed this Twelfth Day of May, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,636,206
DATED : JUNE 3, 1997
INVENTOR(S) : Shigeo AMEMIYA et al

It is certified that error appears in the above-indentified patent and that said Letters Patent is hereby corrected as shown below:

On the title page, item (30), insert–Foreign Application Priority Data, May 19, 1994, Japan, 6-105261–.

Signed and Sealed this

Second Day of February, 1999

Attest:

Attesting Officer

*Acting Commissioner of Patents and Trademarks*